Figures 1, 2:
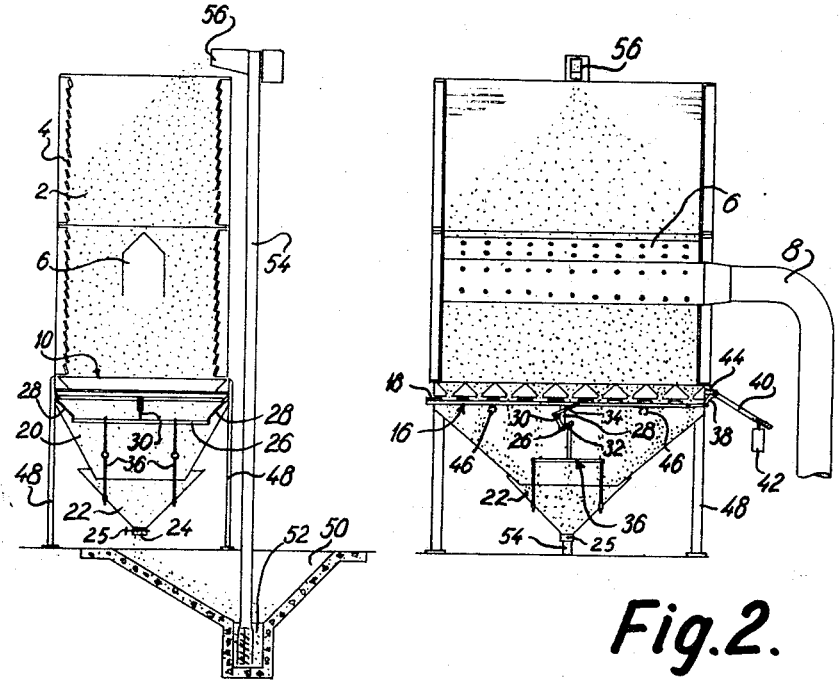

INVENTOR.
H. P. Pedersen
BY Richards & Geier
ATTORNEYS.

June 27, 1967  H. P. PEDERSEN  3,327,611
MIXING APPARATUS
Filed Feb. 15, 1966  2 Sheets-Sheet 2

INVENTOR.
H. P. Pedersen
BY Richards & Geier
ATTORNEYS.

United States Patent Office 3,327,611
Patented June 27, 1967

3,327,611
MIXING APPARATUS
Hans Peter Pedersen, Volderupgaard per Gylling,
Denmark
Filed Feb. 15, 1966, Ser. No. 527,601
16 Claims. (Cl. 99—237)

The present invention relates to an apparatus for mixing portions of granular material such as grain or feed stuff.

The main object of the invention is to provide an apparatus in which a thorough mixing of a portion of a granular material may be obtained in short time.

Another essential object of the invention is to provide a mixing apparatus which is well suited for use as a drying apparatus for grain when fitted with simple heating means.

A further object of the invention is to provide a mixing apparatus which is also particularly well suited for use in connection with an aspirator device for cleaning the grain being mixed or mixed and dried.

Still a further object of the invention is to provide a mixing apparatus which is simple in construction and easy to operate.

According to the invention an apparatus is provided consisting of a material container having a substantially flat bottom portion in which there is provided a plurality of outlet openings distributed substantially evenly over the area of the bottom portion and means for collecting the material flowing out of the container through said openings and for continuously moving this discharged material up to the top of the container for reintroduction of the material into the container. With the use of the flat bottom portion it is ensured that all the material in the container will participate in the downwardly directed movement caused by the outflow of material through the outlet openings, whereby every material layer leaving the container through the bottom thereof will be mixed together and reintroduced as an uppermost material layer in the container. By this introduction the top layer will assume an inclined position according to the natural talus of the material, and this inclination of the layer will be substantially maintained as the layer again sinks down through the container during the continued outflow of material therefrom. When this inclined layer reaches the bottom again it will not be let out as one single layer due to the inclination thereof, but parts thereof will be let out together with parts of previously and subsequently reintroduced inclined layer so that the layer of material now let out will contain material from different layers whereby an intensive mixing of the entire amount of material will be obtained when the material is circulated several times through the apparatus in this manner. Thus the apparatus is applicable as a mixer for, for example, feed stuff.

When heating means such as means for blowing warm air into the material are added to this apparatus it becomes a perfect grain drying apparatus. It is known in the art to use such heating means in connection with a container through which the material is circulated, but these containers have a simple narrow outlet opening so that no thorough mixing of the material adjacent the sides of the container under these circumstances take place. Experiments have shown that a thorough mixing is of outstanding importance in connection with grain drying, and for this reason the apparatus according to the invention was found to be applicable as a grain drying apparatus of extreme efficiency. A perfect mixing seems to be an important condition for obtaining a completely stock-roof dried grain material and a good germination capacity of the grain. A germination capacity of up to 99% has been observed by grain dried from an extremely wet condition in an apparatus according to the invention.

Figure 3:
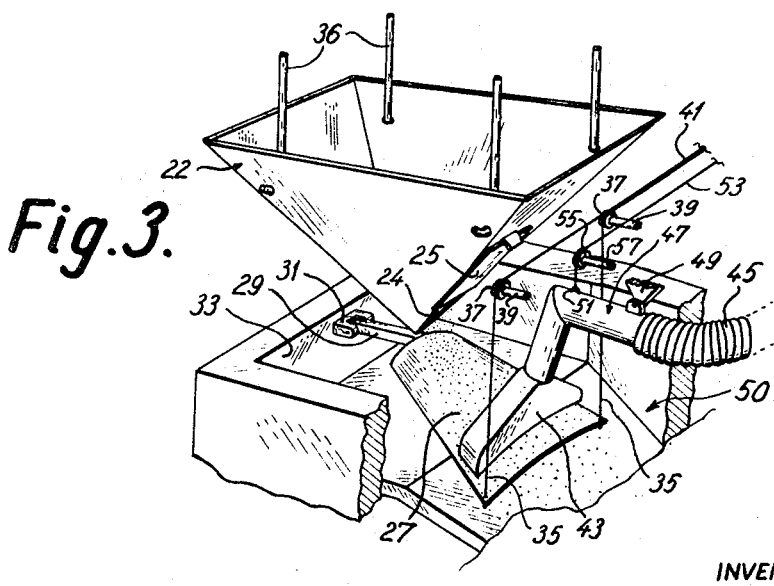
Figure 4:
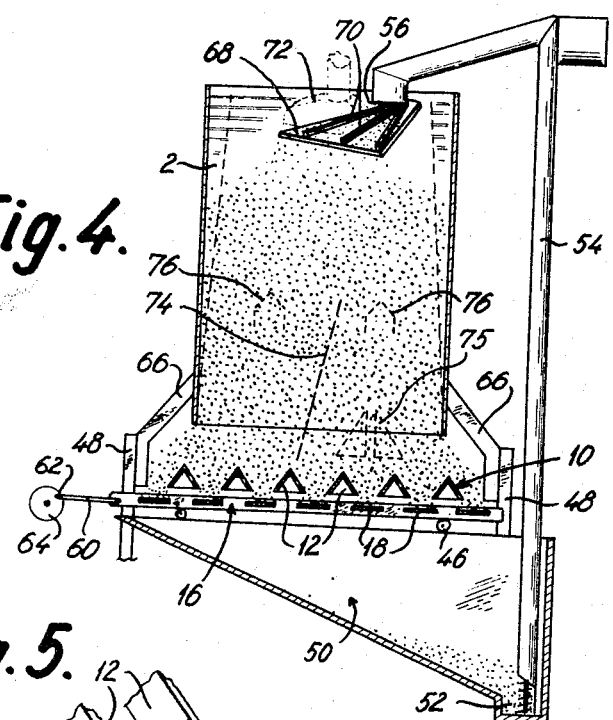

The invention will now be described in more detail with reference to the accompanying drawing in which:

FIGURE 1 is sectional view of a mixing and drying apparatus according to a preferred embodiment of the invention, seen from the side, FIGURE 2 is a corresponding sectional view seen from the front side, FIGURE 3 is a perspective view of the lower part of the apparatus shown in FIGURES 1 and 2 provided with additional means for cleaning the granular material, FIGURE 4 is a sectional view corresponding to FIGURE 2 and showing another embodiment of the apparatus according to the invention.

Figure 5:
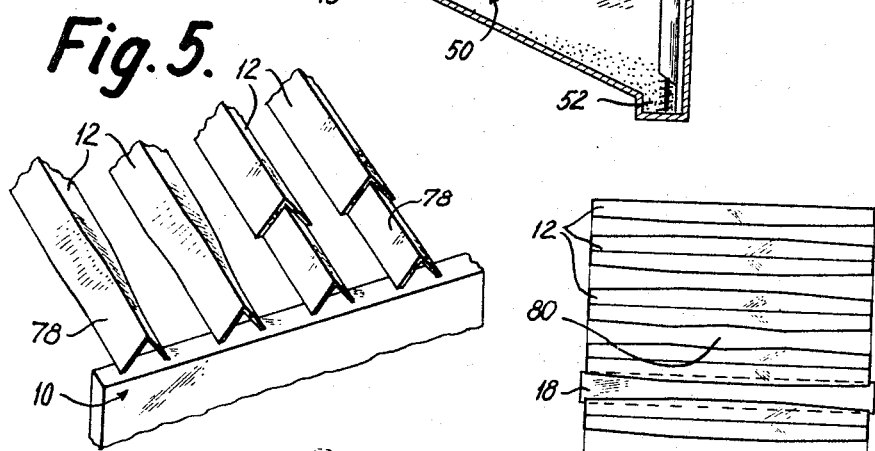
Figure 6:
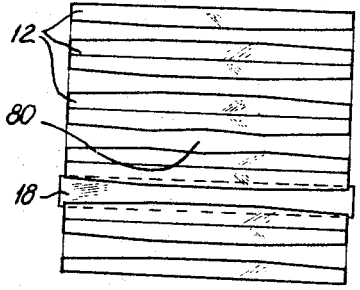
Figure 7:
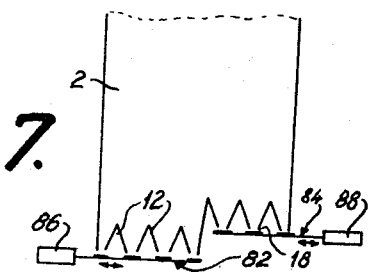

FIGURE 5 is a perspective sectional view of the container bottom in a particular embodiment thereof, FIGURE 6 is a plane top view of the bottom portion, and FIGURE 7 is a diagrammatic sectional side view of the bottom closure in a modified embodiment thereof.

The apparatus shown in FIGURES 1 and 2 comprises a silo container 2 of rectangular cross-section and with vertical walls, of which the front and back walls 4 are constituted by inclined and mutually spaced lamellas, between which air may escape from the silo. The container is open at the top and has in its middle portion a horizontal, transverse tube or channel 6 having an upwardly tapering roof and side walls but no bottom wall, all the walls being perforated to enable warm air to be blown out into the silo contents from exterior warm air generating means (not shown) connected to the channel by means of a tube 8.

The bottom of the container 2, generally designated 10, consists of a number of transverse ribs 12 of triangular section and leaving between their lower extremities a corresponding number of slots 14, through which the granular material may fall out. Below the fixed grate bottom 10 there is arranged a reciprocal grate member generally designated 16 and formed of a number of plate lamellas 18 having the same mutual spacing as the slots 14 so that all the slots may be closed at the same time when the lower grate 16 is positioned with the lamellas below the slots 14, while all the slots are opened when the lower grate is moved sideways to a position in which the lamellas as shown in FIGURE 2 are situated in the space between the slots. A bottom construction of this nature is known in the art, but it has not previously been used as a means for causing a rapid mixing of material circulated through a container provided with such a bottom.

Beneath the two grates 10 and 16 there is arranged a rigid hopper 20, below the mouth of which a delivery hopper 22 having a delivery opening 24 is suspended in the following manner: A transverse middle shaft 26 is journalled in two bracket bearings 28 rigidly secured to the outer frame work of the silo. The shaft is provided with an upwardly extending arm 30 and two sidewardly extending arms 32 (see FIGURE 2). The free end of the arm 30 is connected with the lower grate bottom member 16 by means of an inclined connection lever 34 swingably secured in both ends. The delivery hopper 22 is suspended in the free ends of the arms 32 by means of two trapeze suspensions generally designated 36.

As shown in the right hand side of FIGURE 2 the reciprocal lower grate 16 is swingably connected to the free end of a downwardly extending arm 38 belonging to an angular member, the other arm 40 of which carries a weight 42, the angular member 38, 40 being swingable around a fixed axis 44. The grate 16 is supported by means of rollers 46 secured to the frame structure.

It will be understood that an increased weight of the delivery hopper 22 will cause the shaft 26 to be turned clockwise (FIGURE 2) which in its turn causes the arms 30, 34 to be moved to the right to thereby bring the lower grate bottom 16 to the position in which all the slots 14 are closed by the lamellas 18 while the angular member 38, 40 is swung anticlockwise against the action of the weight 42. The system is so adapted that the action of the weight 42 is overcome when the hopper 22 is almost full of the grain material, while the system returns to the initial position when the hopper 22 is almost empty; means such as spring means (not shown) are provided in suitable manner for producing a corresponding snap action in the movement.

The silo is supported by legs 48 standing on the ground. A trench 50, having inclined sides is provided beneath the silo, one side of the trench being located beneath the opening 24 and the center 52 of the trench located just outside the rear of the silo container. A power driven elevator or grain worm 54 is installed between the cavity 52 and the top of the silo container, where it has an outlet opening 56.

For filling the silo with the desired amount of grain material the lower grate 16 is arrested in the closed position and the material is poured down into the trench 50, from where it is lifted to the top of the silo by means of the grain worm 54 and poured out into the container through outlet opening 56. When the silo has been filled with the desired amount the warm air generator is started and the lower grate 16 is released from its arrested closed position. Since the delivery hopper 22 is empty, the weight 42 will immediately cause the grate to move to its open position shown in FIGURE 2. The granular material will fall down through the slots 14 and will be collected in the hopper 22, from which it will fall continuously down into the trench 50 through the delivery opening 24. Since the area of the delivery opening 24 is much smaller than the total area of the open slots 14, the hopper 22 will very quickly—almost instantaneously—be filled with granular material so as to cause the lower grate 16 to close all the slots 14. The hopper 22 is emptied at a slower rate by the outflow of the grain through the opening 24. As the material falls down into the trench 50 it is continuously moved up to the top of the silo by means of the worm 54 and poured out on the top of the silo contents. When the hopper 22 is empty or almost empty the weight 42 will overcome the snap action resistance previously referred to so as to again open the slots 14.

It will be appreciated that by this arrangement it will be possible to circulate the entire silo contents which can be circulated for example 10 to 15 times; the material will be very uniformly mixed since the material in the single layers let out through the bottom closure is mixed in the hopper 22 and the trench 50, whereas a mixing between material from the different layers is obtained due to the fact that each layer is reintroduced in the container as an inclined or cone formed layer at the top of the silo contents so as to be let out the next time together with material from other previously or subsequently reintroduced layers.

As far as the grain drying is concerned it is generally of utmost importance to have the grain portion dried as uniformly as possible. In more expensive grain dryers this is accomplished by the use of a complex heating equipment ensuring an even distribution of the drying air throughout the material contained in the container. Such equipment is comparatively expensive, and it will be noted that the heating equipment used with the apparatus according to the invention is as simple and cheap as possible since it merely consists of one single channel 6 arranged centrally for blowing warm air into the grain. Then the heat distribution will of course be rather uneven, but due to the thorough mixing of the material all parts of the material will sooner or later get in touch with the heating zone, and it has been found that the quality of grain dried by the method according to the invention is not surpassed by the quality of grain dried in far more expensive drying silos.

In this connection it is a special advantage that the heating channel 6 is arranged centrally, i.e., spaced from both sides of the container, since the grain will thereby be allowed to descend freely along the sides of the container, and this feature is very important for obtaining a good mixing of the material.

It may be desired to work with a slower circulation race than corresponding to the full capacity of the transportation means 54, for example for subjecting the grain to warm air for longer periods, and for this purpose there is arranged an adjustable valve 23 in the outlet opening 24 from the hopper 22. Since the rate with which the material is sluiced out from the container is solely depending upon the weight variations of the hopper 22 the outflow through the outlet opening 24 can be adjusted to any desired rate without any risk of overfilling the hopper 22 or otherwise influencing the performance of the bottom closure except just the average rate of the delivery of grain from the flat bottom. Then it is possible to work with a relatively slow circulation rate without using a corresponding slow delivery from the bottom of the container which would make the delivery unsafe, especially since the delivery should take place from a plurality of sufficiently broad openings to allow a safe and uniform descent of material all over the cross section of the container.

For emptying the silo after the treatment of the material it is sufficient to connect the upper outlet opening 56 of the grain worm to suitable tube means for conducting the material to a store or to a sack filling station. This connection may be established in a simple manner, for example by having an inlet opening for the tube means arranged so as to come in operative engagement with the opening 56 when this latter is swung out from its position shown in FIGURE 1. Thereafter, the silo is allowed to continue its outsluicing operation until it is empty.

FIGURE 3 shows a perspective view of the lower hopper 22 and a part of the trench 50 therebelow. The hopper 22 is shown in a slightly modified embodiment where the outlet opening 24 is provided as a lower triangular side opening in one of the inclined side walls of the hopper and is covered by a valve plate 25 which is movable up and down in holding tracks (not shown) so as to allow an adjustment of the effective outlet area of the opening 24. Beneath the opening 24 there is arranged a curved plate member 27 having a backwardly extending arm 29 which is swingably hinged to a rigid bracket 31 at a rear wall portion 33 of the trench 50 so that the entire plate member 27 can be swung up and down around this hinge connection. In each of the outer corners of the plate 27 there is secured a pulling wire 35 passing a pair of rollers 37 mounted on rigid shafts 39 connected with the framework of the silo. These wires are coupled together adjacent their free ends 41, and it will be understood that the plate 27 may be set in any desired inclination by securing the wire ends 41 in any suitable manner to a fixed point with more or less of the wire 35 between the plate member and the rollers 37. The cross sectional curvature of the plate member 27 is relatively big at the top portion thereof while the plate member is flattening out towards the lower end thereof so that grain falling down on the plate member from the outlet opening 24 will be spread over the plate member and leave the lower edge of the plate uniformly distributed in a thin layer all over the breadth of the plate. Thereafter the grain falls further down into the trench 50 along the inclined bottom thereof as shown in the lower part of FIGURE 1.

Spaced slightly above the lower end of the plate member 27 there is provided a suction mouth piece 43 connected to a suction tube 45 through a tube knee 47, the upper part of which is swingably hinged to a rigid frame structure part 49 adjacent the rear end. Adjacent its front end it is provided with an eyelet 51 to which is secured a wire 53 passing round a roller 55 on a fixed shaft 57, wherefrom the wire 53 extends sideways out to adjustable securing means (not shown) corresponding to those used for holding the wire end 41. In this manner also the mouth piece 43 may be raised and lowered by adjustment of the length of the wire 53 whereby the knee tube 47 will assume different angular positions relatively to the suspension member 49.

With the arrangement described it will be possible, therefore, to adjust the height of the mouth piece 43 over the plate member 47 to any desired size irrespectively of the vertical position of the outer end of the plate 27. When the suction tube 45 is connected to a suction device (not shown) such as the air intake of a blower driven by the same motor as used for driving the grain worm 54 different kinds of impurities will be sucked away from the grain passing the mouth piece 43 in a thin layer on the plate 27 so that the grain will also be winnowed during the drying and mixing thereof by means of the aspirator device described.

With a suitable inclination of the plate member 27, for example of approximately 45°, the grains show a tendency to spring up from the plate as they fall down thereon from the opening 24 so that all the material delivered through this opening will pass the mouth piece 43 in a calm flow of small thickness. The time in which the grains are subjected to the suction effect depends upon their velocity so that this time may be adjusted as desired by an adjustment of the inclination of the plate member 27 in the manner described above. Such adjustment may be desired during the operation of the apparatus, viz. as the material is becoming gradually drier. An adjustment may also be desired when the apparatus is charged with another type of grain.

It is well-known in the art to winnow a flow of grain by means of an aspirator device, but the use thereof in the present connection has a quite specific advantage, viz. that the granular material is repeatedly subjected to the aspiration treatment during the operation of the apparatus. Hereby it is possible to reduce the suction effect relatively to aspirators wherein all impurities should be removed as the material for first and last time passes the device; in this case the suction effect must be relatively high, but this has the disadvantage that also grains may be sucked away from the flow of material. This disadvantage may be avoided by the apparatus according to the invention which will thereby constitute a very cheap and efficient grain treating apparatus delivering a perfectly dried and winnowed grain product of extremely high quality.

Also in the embodiment of the apparatus shown in FIGURE 4 the apparatus comprises a material container 2, a bottom grate member 10 consisting of mutually spaced cross bars 12, a lower reciprocally arranged grate member 16 provided with closing lamellas 18 which are here shown in the position in which they close the outlet openings between the cross bars 12, a trench 50, and a grain worm 54 or equivalent grain transportation means having an outlet opening 56 located adjacent the top of the container 2. The lower grate member 16 is here shown as being reciprocal by means of link connection 60 to an eccentric point 62 of a rotating disc 64 which is rotated by motor means (not shown), preferably through an adjustable gear connection. The lower grate member may also be driven from a vibration mechanism as well-known in the art.

The bottom portion 10, 16 of the apparatus is in this embodiment longer than the cross section of the container 2, and the container 2 is mounted on supports 66 in such a position that the lower edge of the container is spaced at a distance above the bottom. As indicated the grain will hereby flow outwardly from the lower edge of the container so as to cover the bottom portion despite the greater area thereof.

As in the first described embodiment the grain material will be let out through the bottom layer by layer during the intermittent operation of the closing grate member 16, and the material will be reintroduced through the upper inlet opening 56.

In this embodiment an aspirator device is positioned underneath the inlet opening 56 in the form of an inclined plate member 68 which is provided with guiding ribs 70 diverging from each other in downward direction in order to flatten out the flow of material from the opening 56. A suction mouth piece 72 is mounted over a lower portion of the plate member 68 so as to treat the grain in exactly the same manner as described with reference to the aspirator device shown in FIGURE 3.

In the embodiment shown in FIGURE 4 it is an important feature that the bottom is of enlarged size relatively to the container. The purpose of this construction is to obtain the best possible conditions for facilitating an easy descent of material in the area immediately along the side walls of the container, since it is important for the invention that the material descends easily in all parts of the cross section of the container. When the material is given the possibility of flowing outwardly from the lower edge of the container it will be understood that the resistance against the material descent in the side wall area will be considerably reduced so that the flow from the sides may even be accelerated relatively to the flow from the middle portion of the container.

In order to further reduce the flow resistance along the side walls these may be mounted in an inclined position as shown in dotted lines in FIGURE 4. With an inclination of approximately 45° or corresponding to the natural talus of the particular grain material there will be no flow resistance at all along the sides, whereby the side walls will not be materially required at all.

When it is ensured that the material may descend in all parts of the cross section of the container it may greatly improve the mixing effect of the apparatus if the material in one part of the cross section descends quicker than the material in another part thereof because every reintroduced layer in the container will then be given a relatively long vertical extension when the first part thereof again reaches the bottom for renewed outsluicing, so that the new layer let out from the bottom will contain material from a wide range of previously reintroduced layers, whereby an intensive mixing may be obtained when the material has circulated for example 5 times only through the container.

A such non-uniform descent of the material in the container may be obtained by means of the described bottom closure having uniformly distributed outlet openings when as shown in FIGURE 4 the material is given the opportunity to leave the container in non-uniform manner over at least a lower cross section thereof. A further possibility consists in mounting an inclined guiding plate 74 in the container as shown in dotted lines in FIGURE 4. This plate will cause the descending material to flow faster at the right hand side thereof since the space below the plate at this side communicates with more outlet openings than that of the other side. This effect may also be obtained by means of the wall portions of one or more heating channels of irregular cross sectional form. In FIGURE 4, however, there are indicated in dotted lines two regular heating channels 76.

If it is desired to work with relatively few but broad delivery openings between the cross bars 12 it may be advantageous to provide suitable grain distribution members as indicated in dotted lines at 24 above the bottom member 10 in order to counteract the formation of non-descending columns of grain above the broader cross bars 12.

Another method of precipitating the descent of material along the sides of the container is illustrated in FIGURE 5 which shows a section of the bottom grate member 10. Also in this figure the cross bars are designated as 12, and as shown these cross bars have portions 78 of reduced breadth adjacent their outer ends, thus leaving between them outlet slots of increased breadth relatively to the central portion of these slots. When the slots are opened by the lower grate member (not shown) the material adjacent the outer ends of the cross bars, i.e. adjacent the corresponding side wall of the container, will be able to leave the bottom at an increased rate causing in its turn a quicker descent of material along the side wall.

The entire bottom portion is shown in FIGURE 6, in which the enlarged outlet area along the edges of the bottom will be easily observed. Also a central portion 80 of the bottom is provided with an enlarged outlet opening. One of the lamellas 18 of the lower grate member 16 is shown in its closed position. Enlarged outlet openings 80 may be provided anywhere on the bottom member.

The non-uniform outlet openings may also be established by means of an upper grate member 10 having uniformly distributed outlet openings, since in this case the lower grate member may have closing lamellas of non-uniform breadths so that they in their open position will open more for the outlet openings in some areas than in other areas; FIGURE 6 may serve as an illustration of this modification, since in this case the reference numeral 18 may designate the slot formed outlet opening between two neighbour cross bars in the upper grate member, whereas the reference numeral 12 may designate the closing lamellas of the lower grate member seen from below.

Still a further method of producing a non-uniform delivery from the container is schematically illustrated in FIGURE 7, wherein the lower grate member 16 is shown as divided in two independent parts 82 and 84, each being connected with mechanism 86, 88 respectively, for imparting to each of the grate member parts a reciprocal movement corresponding to that described in connection with FIGURE 4. The driving means for the two mechanisms 86 and 88 are so adapted (in a manner not shown) that the two grate parts are reciprocated with such different movement characteristics that the average time in which the outlet openings in one side of the bottom are open is different from the corresponding time for the other part of the bottom. This difference may be obtained by controlling the moving mechanism in such a manner that the open periods in one side of the bottom are longer than the open periods in the other side and/or that the frequency of equally long open periods is greater in one side than in the other side. A suitable mechanism for controlling these movements can be made in many different ways, and it is believed that the detailed construction thereof should cause no problems to a person skilled in the art.

The two separate closing grate members 82 and 84 may well be used in alignment with each other, for example in connection with the apparatus shown in FIGURES 2 and 4, but in FIGURE 7 the arrangement is shown in use with a silo having one part of its bottom situated at a higher level than the other part. By this feature a further precipitation of a thorough mixing is obtained because a reintroduced material layer will be let out in part as it reaches the higher bottom portion, whereby the material thus let out will be mixed with material from a previously reintroduced layer, of which a part at the same time has proceeded to the lower bottom portion.

It will be obvious that the slot-shaped outlet openings of the bottom may be substituted by uniformly or non-uniformly distributed holes of round or polygonal form. Moreover, other kinds of closure means than a lower reciprocal grate member may be used with the apparatus, which will also be obvious to those skilled in the art; there exists an advanced art in the field of closure arrangements for outlet openings.

Also the grain worm 54 may be substituted by other known grain transportation means such as a cup elevator or a pneumatic transportation system; in the latter case the grain blower used may additionally serve as a blower for delivering air to the heating channel 6. The pneumatic transportation may be carried out by means of warm air whereby a drying effect is obtained during the elevation of the grain material from the collecting means 50 to the introduction opening 56.

What I claim is:

1. An apparatus for mixing and drying portions of granular material comprising in combination: a material container having a bottom, said bottom having an area at least equal to the cross sectional area of said container and being provided with a plurality of outlet openings distributed substantially evenly over the entire area of said bottom, heating means for supplying a heating medium to said material, said heating means being located in a position relatively to the inner sides of said container in which the heating means allow a substantially free descent of granular material along said sides, material collecting means located beneath said outlet openings for receiving granular material delivered from said outlet openings, introduction means located at the top of said container and operable to introduce granular material therein, and transportation means interconnecting said collecting means and said introduction means for elevating granular material from said collecting means up to said introduction means.

2. An apparatus as claimed in claim 1, in which said bottom is provided with closing means for closing and opening said outlet openings, and control means operatively connected with said closing means for intermittently operating said closing means.

3. An apparatus as claimed in claim 2, in which there is arranged an intermediate collecting container between said outlet openings and said collecting means, said collecting container having a delivery opening above said means and an adjustable valve member associated therewith, said collecting container being suspended in means for registering weight variations thereof, said means for closing said outlet openings being operatively connected with said registration means so as to close said openings in response to said collecting container being substantially filled with granular material and to open said openings in response to said collecting container being substantially emptied for granular material.

4. An apparatus as claimed in claim 3, in which said collecting container is suspended in one end of a swingable lever extending sideways from a fixed axis point being operatively connected to said means for closing said outlet openings so as to activate said closing means in response to downward swinging of said swingable lever and to release said closing means in response to upward swinging of said swingable lever, whereas means are provided for permanently influencing said lever with a force moment tending to swing it upwardly and snap action means are provided to present a resistance to the initial movement of said closing means.

5. An apparatus as claimed in claim 4, in which said swingable lever has an extension extending upwardly from said axis point, and having a free end and in which said closing means are constituted by a horizontally reciprocable closure member, said closure member being coupled to the free end of said lever extension so as to be horizontally reciprocable by sideways swinging of said lever extension.

6. An apparatus as claimed in claim 2, in which the average area of said delivery openings is bigger in one part of said bottom than in another part thereof.

7. An apparatus as claimed in claim 2, in which said control means cause said closing means to provide an average opening time per time unit which is greater for outlet openings in one section of the bottom than for outlet openings in another section of the bottom.

8. An apparatus as claimed in claim 1, in which the area of said bottom being provided with said outlet openings is bigger than the cross sectional area of said container.

9. An apparatus as claimed in claim 1, in which inclined guiding plate means are provided inside said container and above the bottom thereof for imparting a horizontal movement component to material descending therealong, whereas both the upper and the lower end of said guiding plate means are situated spaced from the sides of said container.

10. An apparatus as claimed in claim 1, in which the outlet openings in different sections of said bottom are situated in different levels.

11. An apparatus as claimed in claim 1, in which means are provided for introducing a heating medium into said container.

12. An apparatus as claimed in claim 11, in which said means are located spaced from each of at least two opposite sides of said container.

13. An apparatus as claimed in claim 1, in which said heating means consist of one single transversely arranged channel having exterior connection means for receiving warm air under pressure and having openings communicating with the interior of said container.

14. An apparatus as claimed in claim 1, in which there is provided an aspirator device for treating the material flow adjacent a point of the material circulation path defined by said container, said collecting means, said transportation means, and said introduction means.

15. An apparatus as claimed in claim 14, in which the aspirator device comprises an inclined material guiding surface located below an outlet mouth for the material flow, said surface having means for spreading out the descending material flow thereon, and a suction mouthpiece operatively connected with a suction device and located above the surface adjacent the lower end thereof.

16. An apparatus as claimed in claim 15, in which means are provided for adjusting the inclination of said guiding surface.

References Cited

UNITED STATES PATENTS

| | | | |
|---|---|---|---|
| 1,574,210 | 2/1926 | Spaulding | 99—237 |
| 1,884,423 | 10/1932 | Walker | 259—150 |
| 3,168,291 | 12/1965 | Knoedler et al. | 259—97 |

FOREIGN PATENTS 533,673    12/1954    Belgium.

WALTER A. SCHEEL, *Primary Examiner.*

ROBERT W. JENKINS, *Examiner.*